United States Patent [19]

Persson

[11] Patent Number: 4,759,436
[45] Date of Patent: Jul. 26, 1988

[54] EQUIPMENT FOR CONVEYING OBJECTS

[75] Inventor: Lars Persson, Skärholmen, Sweden

[73] Assignee: Ingenjorsfirman Convey AB, Bandhagen, Sweden

[21] Appl. No.: 943,999

[22] Filed: Dec. 22, 1986

[30] Foreign Application Priority Data

Dec. 23, 1985 [SE] Sweden .................................. 8506115

[51] Int. Cl.⁴ .............................................. B65G 15/14
[52] U.S. Cl. .................................... 198/628; 198/627; 198/836
[58] Field of Search ............... 198/721, 732, 626, 628, 198/836, 627; 104/53, 165, 189, 191

[56] References Cited

U.S. PATENT DOCUMENTS

| | | | |
|---|---|---|---|
| 3,237,754 | 3/1966 | Freitag et al. | 198/831 |
| 3,300,028 | 1/1967 | Landrey et al. | 198/721 X |
| 3,865,041 | 2/1975 | Bacon | 104/18 X |
| 4,543,886 | 10/1985 | Spieldiener et al. | 104/53 |

FOREIGN PATENT DOCUMENTS 1113422 8/1961 Fed. Rep. of Germany ... 198/732 X

OTHER PUBLICATIONS

Technical Digest No. 36, Oct. 1974, "Carrier Assemblies for Wave Solder Machine Palletless Conveyor", pp. 31–32, Sharp.

Primary Examiner—Robert J. Spar
Assistant Examiner—Jennifer L. Doyle
Attorney, Agent, or Firm—Banner, Birch, McKie & Beckett

[57] ABSTRACT

An equipment is provided for conveying objects in a curved path. The equipment includes at least one driven conveyor with a radius of curvature appropriate to the conveying path and provided with a plurality of mutually spaced flights for engaging and supporting one side of a conveyed object, and guide elements are provided for engaging and supporting the object at the side opposite the mentioned side.

5 Claims, 2 Drawing Sheets

EQUIPMENT FOR CONVEYING OBJECTS

BACKGROUND OF THE INVENTION

1. Technical Field

The present invention relates to equipment for conveying objects in a curved path.

2. Background Art

It is already known to convey objects in curved paths. One of the conveyors of the prior art includes surface elements which are mutually relatively rotatable in the horizontal plane. Another kind of conveyor includes angularly positioned rollers. Common to these conveyors is that the objects are conveyed such as to rest on the respective conveyor and can thus be subject to damage if they are fragile. In addition, the objects require horizontal and/or flat carrying surfaces.

Conveyors are also known where the objects are suspended and conveyed in curved paths. The disadvantage with this type of conveyor is that it and/or the objects it conveys must be provided with means for connecting conveyor and object together, as well as there being the risk that fragile objects can be damaged.

DISCLOSURE OF THE INVENTION

The object of the present invention is to improve conveyors of the prior art and to provide conveying equipment that does not cause damage to conveyed, fragile objects, and that is reliable and simple in its construction.

This object is satisfied by the inventive equipment being given the distinguishing features disclosed in the claims.

DETAILED DESCRIPTION OF THE PREFERRED EMBODIMENT

Figure 1:
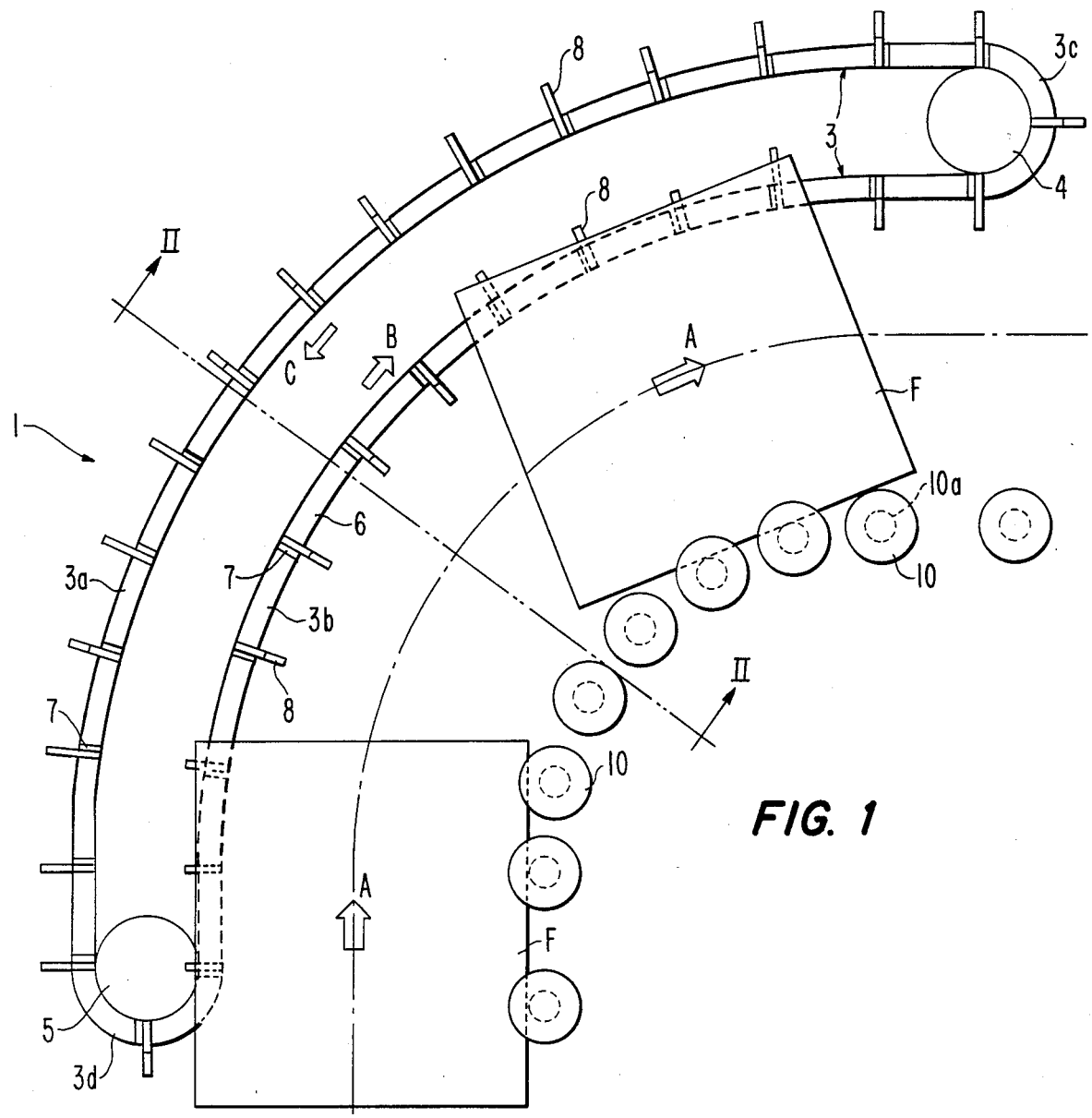
FIG. 1 is a schematic plan seen from above of conveying equipment in accordance with the invention.
Figure 2:
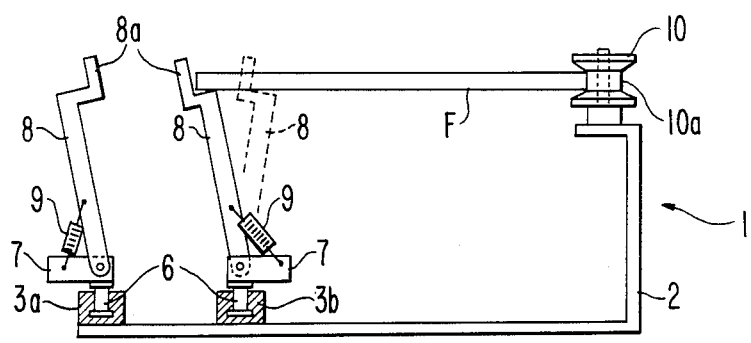
FIG. 2 is a section substantially along the line II—II in FIG. 1.

A conveying equipment for objects F is illustrated in FIGS. 1 and 2. The equipment 1 is carried by a stand 2. A section 3 having an upwardly open trough is attached to the stand 2. The section 3 extends in two parallel parts 3a and 3b, which are connected to each other via curved end portions 3c and 3d of the section, it thus forms a closed loop. Chainwheels 4 and 5 are respectively arranged at the end portions 3c and 3d. One of the chainwheels, e.g. 4, is driven for counterclockwise rotation in FIG. 1. A chain 6 meshes with the chainwheels 4, 5 and moves in the trough of the section 3. Ears 7 are attached to the chain 6 at given mutual spacing. Pivotally attached to each ear 7 there is a flight 8 in the shape of an arm with an L-shaped upper part 8a. The flight is urged to pivot outwards from the section 3 with the aid of a tension spring mounted between the flight 8 and ear 7. In FIG. 2, the left-hand flight 8 and the righthand flight drawn with dashed lines illustrate their inactive positions.

The section 3 has a radius of curvature appropriate to that of the conveying path and dimensions of the objects to be conveyed. This also applies to a guide means comprising a set of pulleys 10 having vertical shafts mounted for rotation on the stand 2. Each pulley is provided with an annular recess 10a.

The function of the equipment described above will now be explained.

The objects F have a configuration suited to the conveying equipment, or vice versa, and may be one of two kinds, either the actual objects to be conveyed, or carriers for such objects, particularly if the latter are fragile. In the FIGURES the objects are shown as quadratic circuit boards provided with fragile components. The configuration and distance at right angles to the centre of the conveying path, denoted by arrows A in FIG. 1, of the object F determine the distance between the section part 3b and the pulleys 10.

The objects F approach the conveying equipment 1 on a straight conveyor, unillustrated in FIG. 1, but arranged to feed the objects to the equipment from a location at the bottom of the FIGURE. The objects are at a height suitable for one edge thereof to enter the recesses in the pulleys 10. The chain 6 is driven by the chainwheel 4 in the directions of arrows B and C, and when the flight 8, i.e. the one bottommost in FIG. 1, engages the object with its upper part 8a the flight is caused to pivot away from the object against the bias of the spring 9. This pivoting movement continues until the distance between the bottom of the recess 10a in the opposing pulley 10 and the substantially vertical flight upper part 8a is the same as the width of the object, when the flight 8 assumes the position illustrated by full lines furthest to the right in FIG. 2. During the pivoting movement, and as the flight moves in the direction of the arrow B, the flight exercises a pressure on the object such as to enable its movement in the direction of arrow B. Flights 8 successively coming into engagement with the object also coact with it to enable its movement in the direction of the arrow B, while the object rests on the substantially horizontal portions of the upper parts 8a and appropriate portions of the recesses 10a in the pulleys 10.

During the conveyance of the object F to the discharge end of the conveying equipment at the chainwheel 4, the flights 8 engaging with the corner portions of the object will pivot still further from it, since these portions will be situated further from the centre of curvature of the section 3 than the rest of it. FIG. 1 illustrates how the flights 8 nearest the corners of the upper object are pivoted to a maximum, while the flights inwards thereof are only partially pivoted. During the entire conveyance along the curved path the object is however pressed between the flights 8 and pulleys 10 with a force sufficient to ensure its continuous movement.

Figure 3:
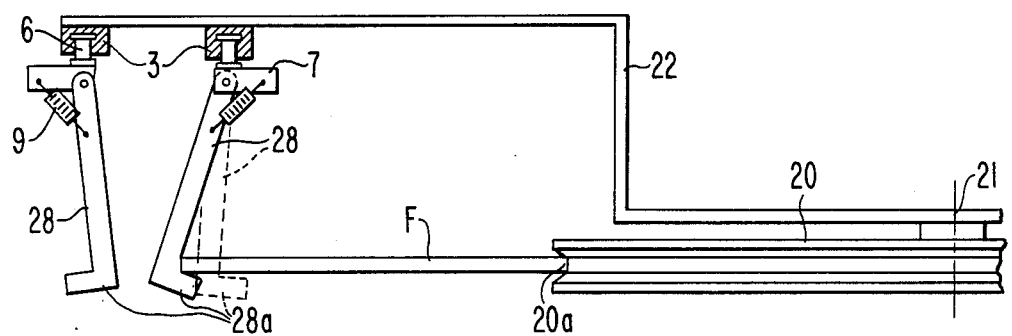
FIG. 3 is a section corresponding to the one in FIG. 2, but illustrating an alternative embodiment.
Figure 4:
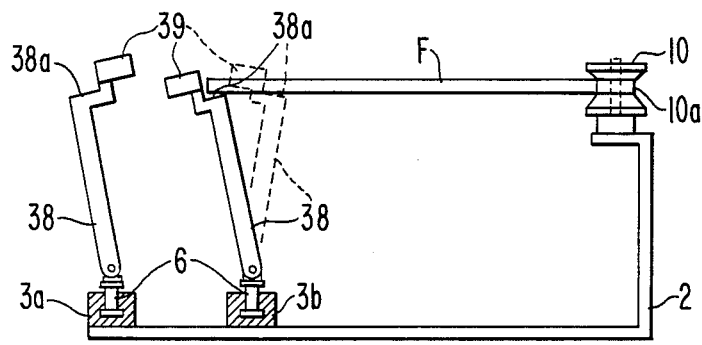
Figure 5:
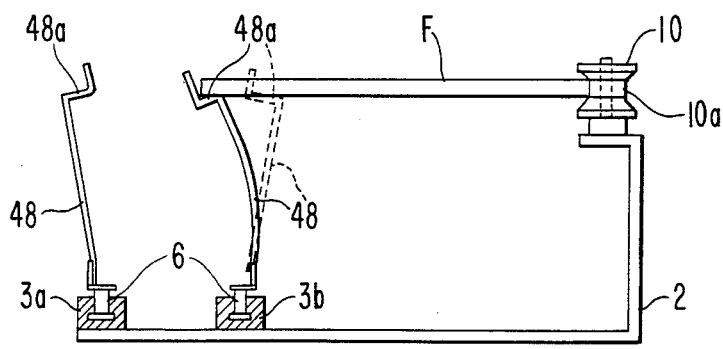

A modified embodiment of the equipment in FIGS. 1 and 2 is illustrated in FIG. 3. Here the section 3, chain 6, chainwheels 4 and 5, ears 7 and springs 9 are the same as corresponding details in the other two FIGURES, although the section 3 is suspended from a stand 22. As distinct from the flights 8 in FIGS. 1 and 2, the flights 28 in FIG. 3 are a plain L-shape, and are intended to support the object F by their lower portions 28a in coaction with a guide means comprising a wheel 20, mounted for rotation on a shaft 21 and provided with an annular recess 20a. In this case the wheel 20 has the same curvature as the set of pulleys 10, and if so desired it can be driven at a rate to suit the chain 6.

Other modifications of the equipment according to FIGS. 1–3 are also possible. For example, the flights 8, 28 and springs 9 may be replaced by leaf or wire springs having substantially the same shape as the arms, or by permanent magnets in the case where the conveyed objects are made from magnetic material. Furthermore, the conveying path may have a curvature other than that in FIG. 1, e.g. an S-shape. It is also possible for the set of pulleys 10 and the section 3 to change places, or to exchange the pulleys for a section similar to the section 3, in order further to improve operational reliability or increase the conveying speed. The pulleys may also be replaced by a guide rail.

Although only a few embodiments of the present invention and modifications thereof have been described above and illustrated in the FIGURES, the invention is not restricted to them, but only by the disclosures in the claims.

What is claimed as new and desired to be secured by Letters Patent of the United States:

1. Equipment for conveying objects in a curved path including means for supporting one edge of a conveyed object comprising conveying means arranged on a radius of curvature appropriate to said path, means for driving said conveying means, and a plurality of flights including conveyed object engaging portions provided with means for engaging and vertically supporting a conveyed object, and means for mounting said flights in spaced relation along said conveying means for movement of said engaging portions toward and from a conveyed object for engaging and vertically supporting one side thereof and for biasing said flights to urge said engaging portion toward a conveyed object, and guide means disposed radially inwardly of said conveying means and provided with means for engaging and vertically supporting a conveyed object on the side opposite from the side engaged by said conveying means, whereby a conveyed object presented between said guide means and the engaging portion of said flights will deflect said flights against said bias and thereby secure and support a conveyed object between the engaging portion of said flights and said guide means for movement of the conveyed object with said conveying means.

2. Equipment as claimed in claim 1 wherein said conveying means is substantially horizontal and said flights extend substantially normal from said conveying means whereby said conveyed object engaging portion is spaced from said conveying means and is adapted to support a conveyed object in spaced relation relative to said conveying means.

3. Equipment as claimed in claim 2 wherein said flights comprise arms and said means for mounting said flights on said conveying means and for biasing said flights to move said engaging portions thereof toward a conveyed object comprise means for pivotally mounting said arms on said conveying means and means for pivotally biasing said arms relative to said conveyor means.

4. Equipment as claimed in claim 2 wherein said arms are formed with means for receiving and for vertically supporting the edge of a conveyed object.

5. Equipment as claimed in claim 4 wherein said guide means includes means for receiving and for vertically supporting the edge of a conveyed object.

* * * * *